(12) United States Patent
Toda et al.

(10) Patent No.: US 8,244,267 B2
(45) Date of Patent: Aug. 14, 2012

(54) COMMUNICATION METHOD AND RADIO COMMUNICATION TERMINAL

(75) Inventors: Takeshi Toda, Yokohama (JP); Taku Nakayama, Yokohama (JP); Shingo Joko, Yokohama (JP)

(73) Assignee: Kyocera Corporation, Kyoto (JP)

( * ) Notice: Subject to any disclaimer, the term of this patent is extended or adjusted under 35 U.S.C. 154(b) by 252 days.

(21) Appl. No.: 12/517,031

(22) PCT Filed: Nov. 29, 2007

(86) PCT No.: PCT/JP2007/073115
§ 371 (c)(1),
(2), (4) Date: Mar. 10, 2010

(87) PCT Pub. No.: WO2006/066139
PCT Pub. Date: Jun. 5, 2008

(65) Prior Publication Data
US 2010/0285811 A1      Nov. 11, 2010

(30) Foreign Application Priority Data
Nov. 29, 2006   (JP) .................................. 2006-322661

(51) Int. Cl.
*G06F 15/16* (2006.01)
(52) U.S. Cl. .................................. 455/452.1; 455/562.1
(58) Field of Classification Search .................. 455/442, 455/450, 452.1, 557, 562.1, 67.11, 69
See application file for complete search history.

(56) References Cited

U.S. PATENT DOCUMENTS
2005/0181832 A1*  8/2005  Ishii et al. .................. 455/562.1
2005/0255889 A1   11/2005 Haseba et al. ................ 455/561
2008/0204318 A1*  8/2008  Thomas et al. ............... 342/361
2009/0029710 A1   1/2009  Ochiai et al. .................. 455/450

FOREIGN PATENT DOCUMENTS
| JP | 01-300634 | 12/1989 |
| JP | 08-172664 | 7/1996 |
| JP | 10-051380 | 2/1998 |
| JP | 11-074831 | 3/1999 |
| JP | 2005-318359 | 11/2005 |
| WO | WO 2006/088082 A1 | 8/2006 |

OTHER PUBLICATIONS

Yoshitaka Hara, "A Multiband Mobile Communication System" IEICE Tech. Rep. vol. 104, No. 680, RCS2004-400 pp. 61-66, Mar. 2005 (with English abstract).

Yoshitaka Hara et al., "System Configuration for Multiband MC-CDM Systems" IEICE Tech. Rep. vol. 104, No. 680, RCS2004-399, pp. 55-60, Mar. 2005 (with English abstract).

* cited by examiner

Primary Examiner — Sam Bhattacharya
(74) Attorney, Agent, or Firm — DLA Piper LLP (US)

(57) ABSTRACT

Even when being located at cell edge in a multiband mobile communication system, a radio communication terminal, is allowed to stably execute cell search so as to easily establish a connection with a radio base station. The radio communication terminal according to the present invention includes: a first determination unit 13 configured to determine whether or not a broadcast map can be received from a plurality of radio base stations; a second determination unit 14 configured to determine whether or not an AAS diversity map can be received from the radio base stations in ascending order of used frequency bands, when it is determined that the broadcast map cannot be received; and a communication controller 15 configured to select a radio base station, which is determined to be a radio base station from which the AAS diversity map can be received, as a connection destination radio base station, and to communicate with the selected radio base station.

8 Claims, 12 Drawing Sheets

(a)

(b)

COMMUNICATION METHOD AND RADIO COMMUNICATION TERMINAL

CROSS-REFERENCE TO THE RELATED APPLICATION

This application is a national stage of international application No. PCT/JP2007/073115 filed on Nov. 29, 2007, which also claims the benefit of priority under 35 UCS 119 to Japanese Patent Application No. 2006-322661 filed on Nov. 29, 2006, the entire contents of which are incorporated herein by reference.

TECHNICAL FIELD

The present invention relates to a communication method and a radio communication terminal for selecting a connection destination radio base station from multiple radio base stations capable of using frequency bands different from each other and for communicating with the selected radio base station.

BACKGROUND ART

FIG. 1 shows a schematic configuration of a conventional mobile communication system. As shown in FIG. 1, the conventional mobile communication system includes a radio communication terminal MS, radio base stations BS, radio network controllers RNC and a core network CN. The radio communication terminal MS executes cell search to search for a connectable cell (radio base station) among multiple cells at the time of network entry or handover.

FIG. 2 shows an example of a process procedure of the cell search executed by the radio communication terminal MS in the mobile communication system shown in FIG. 1. In Step S11 of FIG. 2, the radio communication terminal MS detects reception power of a cell reference signal (CPICH (Common Pilot CHannel) of a BCH (Broadcast Control Channel in a UMTS (Universal Mobile Telecommunications System)) transmitted by a radio base station DS included in neighbor cell information (a neighbor list) Notified by radio base stations BS.

Thereafter, in step S12, the radio communication terminal MS determines whether or not a connection destination candidate cell (radio base station BS) is found, based on a result of comparison between a preset threshold and the reception power of the cell reference signal detected in Step S11. When the connection destination candidate cell is not found, the cell search is executed again in Step S1. On the other hand, when the connection destination candidate cell is found, the process moves to Step S13. Note that, when there is no connection destination candidate cell, the radio communication terminal MS is subjected to a process under out-of-service conditions.

In Step S13, the radio communication terminal MS attempts to access to the connection destination candidate cells in descending order of the reception powers of the cell reference signals. When the connection destination candidate cell does not have a sufficient channel capacity or when the connection destination candidate cell cannot provide the radio communication terminal MS with predetermined communication quality, the access is denied by the connection destination candidate cell.

Specifically, for accommodating the radio communication terminal MS, a cell is required to reserve a sufficient unused channel capacity and a required reception power (a reception power obtained by averaging an instantaneous fading variation and obtained in consideration of path loss caused by long-term so variation and shadowing variation).

When the access is denied by the connection destination candidate cell, the process moves to step S14. On the other hand, when the access is permitted by the connection destination candidate cell, the process moves to Step S15.

In Step S14, the radio communication terminal MS selects a cell (radio base station Bs) having the second largest reception power of the cell reference signal and attempts to access to the cell in Step S13. Meanwhile, in Step S15, the radio communication terminal MS executes access to the radio base station BS to which the access is permitted.

Meanwhile, as a mobile communication system using multiple frequency bands, a multiband mobile communication system has boon known. In the multiband mobile communication system, as shown in FIG. 3, frequency hands are provided while being spaced apart from each other to such an extent that propagation and diffraction characteristics vary among them. Moreover, transmission systems (for example, CDMA, TDMA and OFDMA) may be different among the frequency bands, and each radio base station may use multiple frequency bands.

FIG. 4 shows a network configuration example of the multiband mobile communication system. In FIG. 4, each of the radio network controller RNC, the radio base stations BS and the radio communication terminal MS can use three frequency bands $f_1$, $f_2$ and $f_3$. Each of the radio base stations BS and the radio communication terminal MS includes three transceivers so corresponding to the three frequency bands $f_1$, $f_2$ and $f_3$, and includes a frequency management function.

FIG. 5 shows a schematic configuration example of the radio communication terminal MS in the multiband mobile communication a system. FIG. 5 (a) shows a functional block configuration of the radio base station BS compatible with two frequency bands of an UHF band and a S band (hereinafter referred to as a "dual band"), and the radio communication terminal MS compatible with the dual band, in downlink. FIG. 5 (b) shows a functional block configuration of the radio base station BS compatible with only the UHF band, the radio base station BS compatible with only the S band, and the radio communication terminal MS compatible with the dual band, in the downlink.

Next, with reference to FIGS. 6 and 7, description will be given of an access control method conventionally proposed for the multiband mobile communication system. As shown in FIG. 6, the radio base station BS allocates the high frequency bands ($f_2$ and $f_3$) to the radio communication terminal MS having small path loss within a line-of-sight range or the like. Meanwhile, the radio base station BS allocates the low frequency band ($f_1$) to the radio communication terminal MS in a poor propagation environment beyond the line-of-sight range or the like.

FIG. 7 is a flowchart showing the access control method conventionally proposed for the multiband mobile communication system. In Step $S21_k$ of FIG. 7, the radio communication terminal MS executes cell search for the radio base station BS using the highest frequency band among the radio base stations BS included in the neighbor list, and attempts to access to the found radio base station BS.

When the access is permitted, the ratio communication terminal MS is connected to the radio base station BS using the highest frequency band in Step $S22_k$. Similarly, in Steps $S21_{k-1}$ to $S21_1$, the cell search is executed for the radio base stations BS in descending order of the used frequency hands.

Thereafter, the radio communication terminal MS selects a cell which has provided the largest reception power among the cells (radio base stations BS) capable of accommodating the radio communication terminal MS, and accesses the selected cell (Steps $S22_k$ to $S22_1$).

As described above, in the conventional access control method in the multiband mobile communication system, the radio communication terminal MS accesses the radio base station BS using the high frequency band as long as the terminal MS can be connected thereto (Non-patent Documents 1 and 2, for example).

In other words, the low frequency band is reserved for a user in a very poor propagation environment. The low frequency band is better in propagation characteristics than the high frequency band. For example, the low frequency band produces smaller loss in diffraction or reflection, distance attenuation and instantaneous value variation of a signal received by the radio communication terminal than the high frequency band. Thus, it is desirable to reserve the low frequency band as precious resources.

If the low frequency band can be efficiently utilized, more radio communication terminals in a very poor propagation environment such as in a room, under the ground, behind a building and cell edge (cell boundary) can be served. This contributes not only to improvement in communication services and in profits of a carrier, but also consequently to improvement in utilization efficiency of frequency resources.

Non-patent Document 1: Hara, "A Multiband Mobile Communication System", Shingakugihou, RCS2004-399, March 2005

Non-patent Document 2; Hara, Taira, "System Configuration of Multiband MC-CDM System", Shingakugihou, RCS2004-400, March 2005

DISCLOSURE OF THE INVENTION

Incidentally, as to the radio communication terminal MS located at the cell edge, the reception power from the radio base station BS is close to the minimum reception sensitivity, and relatively large interference is received from the other cells.

However, in the access control method described above, the radio communication terminal MS accesses the radio base stations BS in descending order of the frequency bands. Thus, operation of the radio communication terminal MS located at the cell edge is expected to be unstable during the cell search. When the cell search operation is unstable, it is difficult to establish a connection with the radio base station BS. Particularly, when the radio communication terminal MS is located in the urban area, when a movement speed of the radio communication terminal MS is high, or in other cases, it is more difficult for the radio communication terminal Ms to establish a connection with the radio base station BS.

In consideration of the foregoing problems, it is an object of the present invention to provide a communication method and a radio communication terminal, which enable easy establishment of a connection with a radio base station by allowing the cell search to be stably executed oven when the radio communication terminal is located at the cell edge in a multiband mobile communication system.

In order to solve the foregoing problems, a first characteristic of the present invention is summarized as a communication method in a multiband mobile communication system having a radio communication terminal (a radio communication terminal MS) and a plurality of radio base stations (a radio base station BS1, a radio base station BS2) capable of using a plurality of frequency bands, comprising the steps of: transmitting, at the radio base station, first broadcast control information (a broadcast map) through a broadcast channel common to a plurality of radio communication terminals, the first broadcast control information being used for communication control; transmitting, at the radio base station, dedicated control information (a private map) to a specific radio communication terminal with use of a directional beam, the dedicated control information being used for communication control; transmitting, at the radio base station, second broadcast control information (an AAS diversity map) to a certain radio communication terminal with use of a directional beam, the second broadcast control information indicating allocation of the dedicated control information; determining, at the radio communication terminal, whether or not the first broadcast control information can be received from the radio base stations; determining, at the radio communication terminal, whether or not the second broadcast control information can be received from the radio base stations in ascending order of used frequency bands, when it is determined that The first broadcast control information cannot be received; and selecting, at the radio communication terminal, a radio base station, which is determined to be a radio base station from which the second broadcast control information can be received, as a connection destination radio base station, and communicating, at the radio communication terminal, with the selected radio base station.

According to the characteristic, the radio communication terminal can receive the second broadcast control information stably even at the cell edge by preferentially determining whether or not the second broadcast control information broadcasted from by the radio base station using the lower frequency band can be received, since it is considered that there is a high possibility that the radio communication terminal is located at the cell edge when the first broadcast control information cannot be received. As a result, it is possible to execute the cell search stably and to establish a connection with a radio base station easily.

A second characteristic of the present invention is summarized as the communication method according to the first characteristic, further comprising the step of measuring movement speed of the radio communication terminal, wherein, in the step of determining whether or not the second broadcast control information can be received, whether or not the second broadcast control information can be received is determined for the radio base stations in ascending order of used frequency bands when it is determined that the first broadcast control information cannot be received and when the movement speed exceeds a predetermined threshold.

According to the characteristic, when the movement speed of the radio communication terminal is high, in other words, when the degree of instantaneous value variation of the reception power is high a distance attenuation of the reception power is large, the radio communication terminal preferentially determines whether or not the second broadcast control information broadcasted by the radio base station using the lower frequency band can be received. Thus, the radio communication terminal can stably execute the cell search and easily establish a connection with the radio base station.

A third characteristic of the present invention is summarized as the communication method according to the second characteristic, further comprising the steps of: measuring reception power from the radio base stations; and selecting a radio base station from which reception power is the largest as the connection destination radio base station, when it is determined that the first broadcast control information cannot be received and when the movement speed is equal to or less than a predetermined threshold.

According to the characteristic, when the movement speed of the radio communication terminal is low, in other words, when so the degree of the instantaneous value variation of the reception power is low and the distance attenuation of the reception power is small, the radio communication terminal selects the radio base station from which the reception power is the largest regardless of the frequency band used by the radio base station. Thus, it is possible to reserve radio resources of the UHF band relatively compared with the determination method where the movement speed of the radio communication terminal is high.

A fourth characteristic of the present invention is summarized as the communication method according to the first characteristic, further comprising the step of measuring reception power from the radio base stations, wherein, in the step of determining whether or not the second broadcast control information can be received, whether or not the second broadcast control information can be received is determined for the radio bass stations in ascending order of used frequency bands, when it is determined that the first broadcast control information cannot be received and when at least a difference between a required reception power and a reception power from the radio base station using the higher frequency band is equal to or less than a predetermined threshold.

According to the characteristic, when the differences between the reception powers from the radio base stations and the required reception power are not more than the predetermined threshold, the radio communication terminal preferentially determines whether or not the second broadcast control information broadcasted by the radio base station using the lower frequency band can be received. Thus, the radio communication terminal can so stably execute the cell search and easily establish a connection with the radio base station.

A fifth characteristic of the present invention is summarized as the communication method according to the fourth characteristic, further comprising the step of selecting a radio base station from which reception power is the largest as the connection destination radio base station, when it is determined that the first broadcast control information cannot be received and when at least the difference exceeds a predetermined threshold.

According to the characteristic, it is determined that reception condition of radio waves is superior, when the reception powers from the radio base stations are much larger than the required power. In other words, the radio communication terminal determines that the instantaneous value variation and the distance attenuation of the reception power by a directional beam transmission (beamforming transmission or diversity-transmission) are stabilized even in the high frequency bands, and selects a radio base station (the frequency band) from which reception power is the largest regardless of the frequency band. It is possible to reserve radio resources of the low frequency band, since there is no determination to preferentially use the low frequency.

A sixth characteristic of the present invention is summarized as the communication method according to the first characteristic, further comprising the stop of measuring a reception power from the radio base station, wherein, in the stop so of determining whether or not the second broadcast control information can be received, whether or not the second broadcast control information can be received is determined for the radio base stations in ascending order of used frequency bands, when it is determined that the first broadcast control information cannot be received and when a difference between a reception power from the radio base station using the higher frequency band and a reception power from the radio base station using the lower frequency baud is less than a predetermined value.

According to the characteristic, when the difference between the reception power from the radio base station using the higher frequency band and the reception power from the radio base station using the lower frequency band is less than the predetermined value, the radio communication terminal preferentially determines whether or not the second broadcast control information broadcasted by the radio base station using the lower frequency band can be received. Thus, the radio communication terminal can stably execute the cell search and easily establish the connection with the radio base station.

That is, as described above, the radio communication terminal can stably execute the cell search and the subsequent establishing of the connection, by using the lower frequency band in which the instantaneous value variation and the distance attenuation of the reception power by a directional beam transmission (beamforming transmission or diversity-transmission) are relatively stable.

A seventh characteristic of the present invention is so summarized as the radio communication terminal according to the sixth characteristic, further comprising the step of selecting a radio base station from which reception power is the largest as the connection destination radio base station, when it is determined that the first broadcast control information cannot be received and when the reception power from the radio base station using the higher frequency band is larger than the reception power from the radio base station using the lower frequency band by a predetermined value or more.

According to the characteristic, the radio communication terminal determines that the reception condition of radio waves is superior, when the reception power from the radio base station using the higher frequency band is larger than the reception power from the radio base station using the lower frequency band by the predetermined value or more. In other words, the radio communication terminal determines that the instantaneous value variation and the distance attenuation of the reception power by a directional beam transmission (beamforming transmission or diversity-transmission) are stabilized ven in the high frequency bands, and selects a radio base station (the frequency band) from which reception power is the largest regardless of the frequency band. It is possible to reserve radio resources of the low frequency band, since there is no determination to preferentially use the low frequency.

A eighth characteristic of the present invention is summarized as radio communication terminal used in a multiband mobile communication system having a plurality of radio base stations capable of using a plurality of frequency bands, comprising: a first determination unit (a first determination unit 13) configured to determine whether or not first broadcast control information can be received from the radio base stations, the first broadcast control information being used for communication control; a second determination unit (a second determination unit 14) configured to determine whether or not second broadcast control information can be received from the radio base stations in ascending order of used frequency bands, when it is determined that the first broadcast control information cannot be received, the second broadcast control information indicating allocation of dedicated control information used for communication control; and a communication controller (a communication controller 15) configured to select a radio base station, which is determined to be a radio base station from which the second broadcast control information can be received, as a communication destination radio base station, and to communicate with the selected radio base station, wherein the first broadcast control information is transmitted to a plurality of radio communication terminals through a broadcast channel common to a plurality of radio communication terminals, the dedicated control information is transmitted to a specific radio communication terminal with use of a directional beam, and the second broadcast control information is transmitted to a certain radio communication terminal with use of a directional beam.

According to the characteristic, as described above, the radio communication terminal can stably execute the cell search and the subsequent establishing of the connection, by using the lower frequency band in which the instantaneous value variation and the distance attenuation of the reception power by a so directional beam transmission (beamforming transmission or diversity transmission) are relatively stable.

The present invention can provide a communication method and a radio communication terminal, which enable easy establishment of a connection with a radio base station by allowing the cell search to be stably executed even when the radio communication terminal is located at the cell edge in a multiband mobile communication system.

BEST MODE FOR CARRYING OUT THE INVENTION

Figure 1:
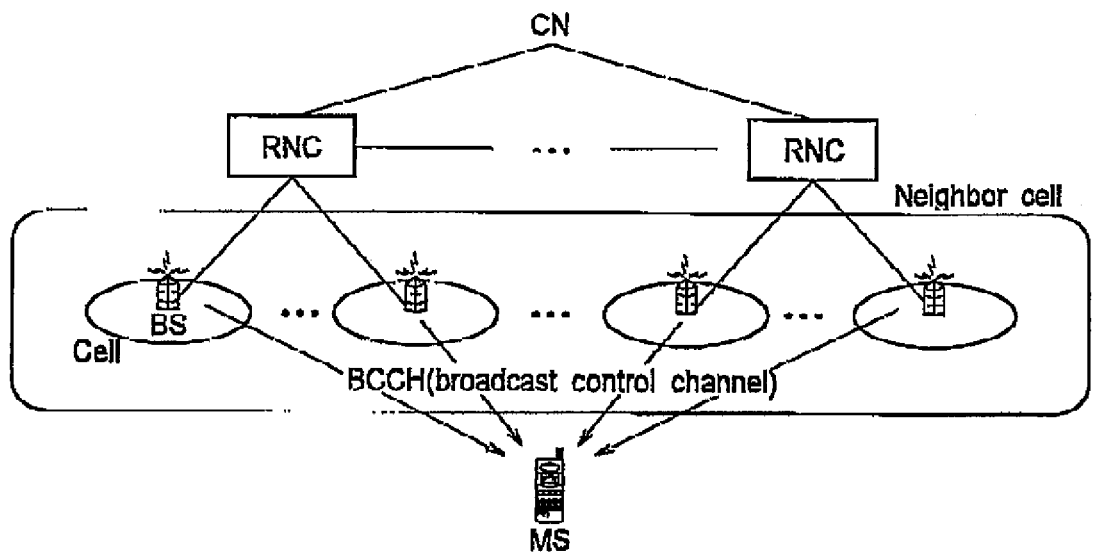
FIG. 1 is a diagram showing a schematic configuration of a mobile communication system according to the background art.
Figure 2:
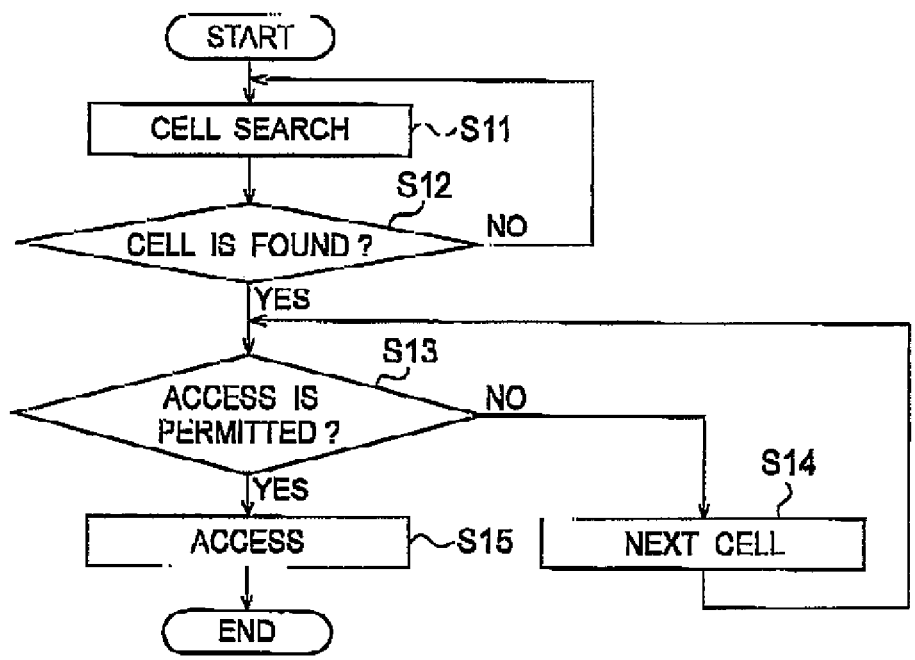
FIG. 2 is a flowchart showing a network entry operation is executed by a radio communication terminal in the mobile communication system according to the background art.
Figure 3:
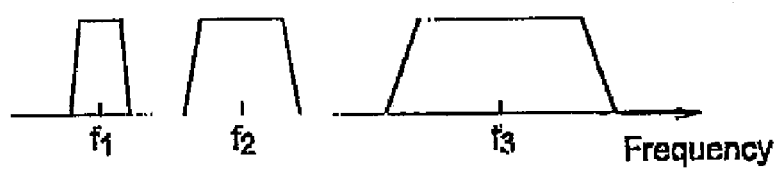
FIG. 3 is a diagram showing an example of a frequency configuration in a multiband mobile communication system according to the background art.
Figure 4:
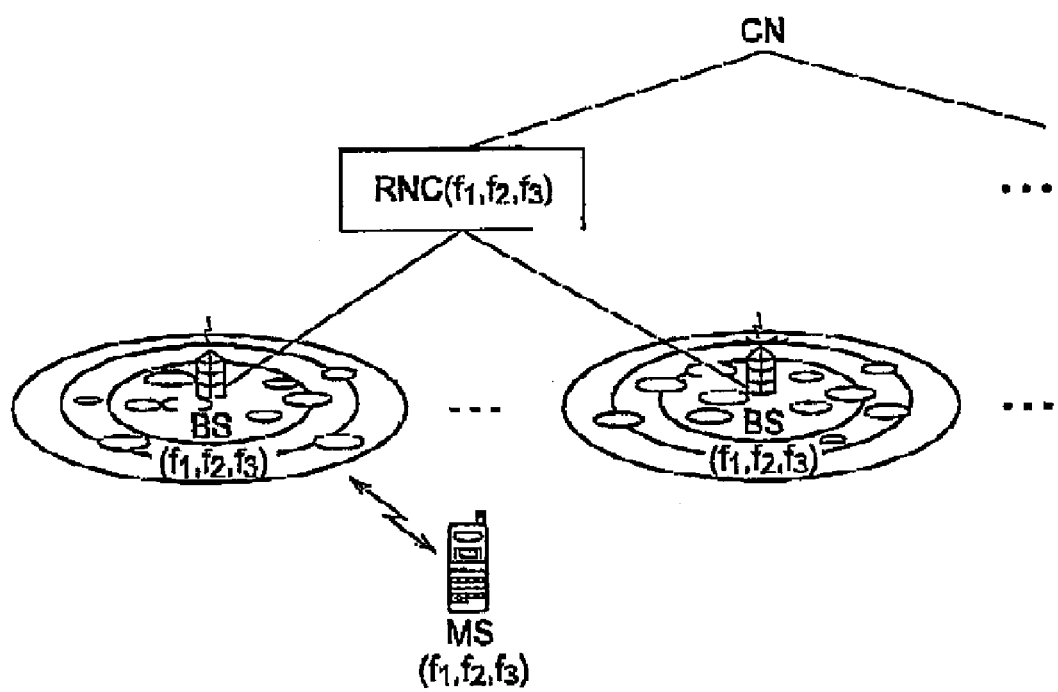
FIG. 4 is a schematic diagram showing a configuration example of the multiband mobile communication system according to the background art.
Figure 5:
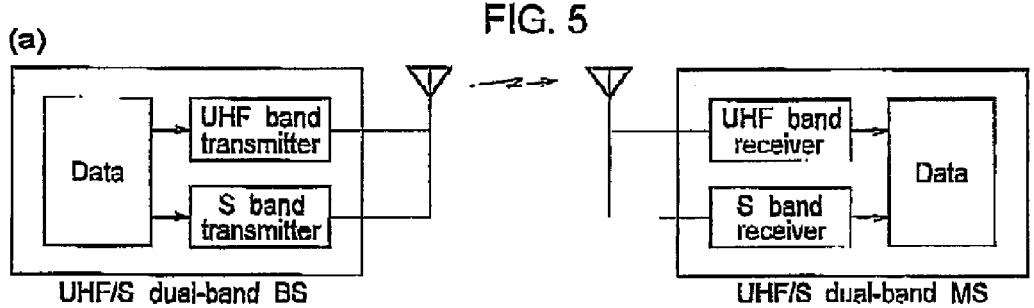
FIG. 5 is a functional block diagram showing a schematic configuration example of the radio communication terminal used in the multiband mobile communication system according to the background art.
Figure 5:
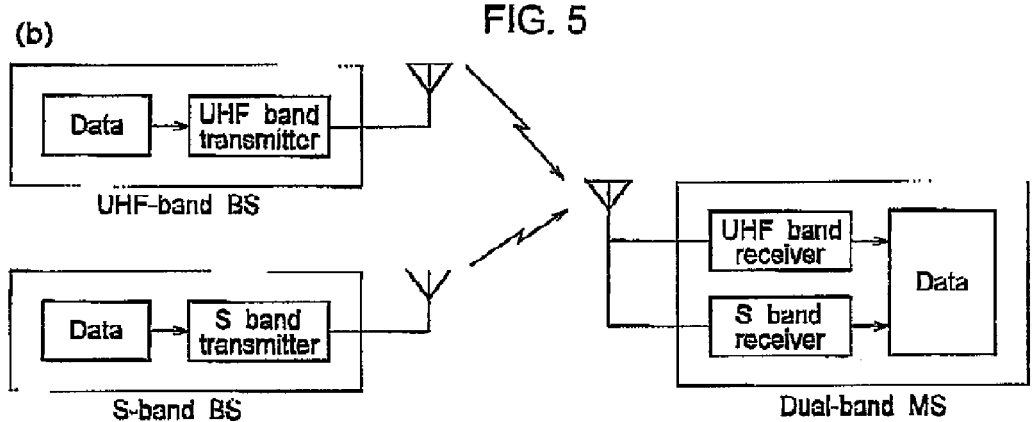
Figure 6:
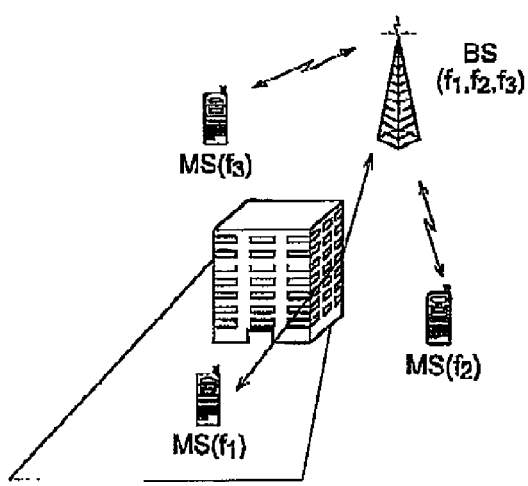
FIG. 6 is a diagram for explaining a frequency band allocation method in the multiband mobile communication system according to the background art.
Figure 7:
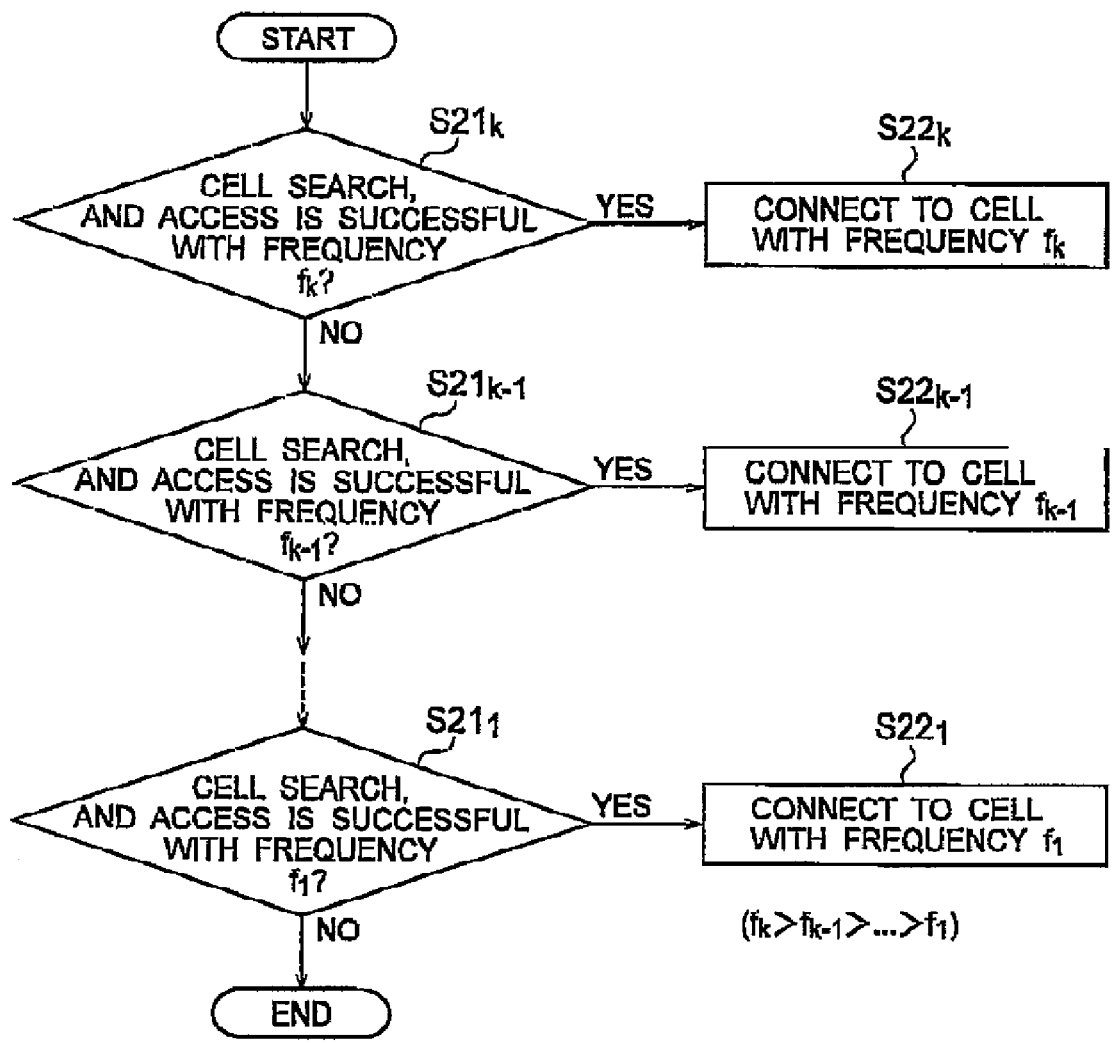
FIG. 7 is a flowchart showing the frequency band allocation method in the multiband mobile communication system according to the background art.

Next, with reference to the drawings, first to fourth a embodiments of the present invention will be described. In the following description of the drawings in the first to fourth embodiments, the same or similar parts will be denoted by the same or similar reference numerals.

First Embodiment

Overall Schematic Configuration of Mobile Communication System

Figure 8:
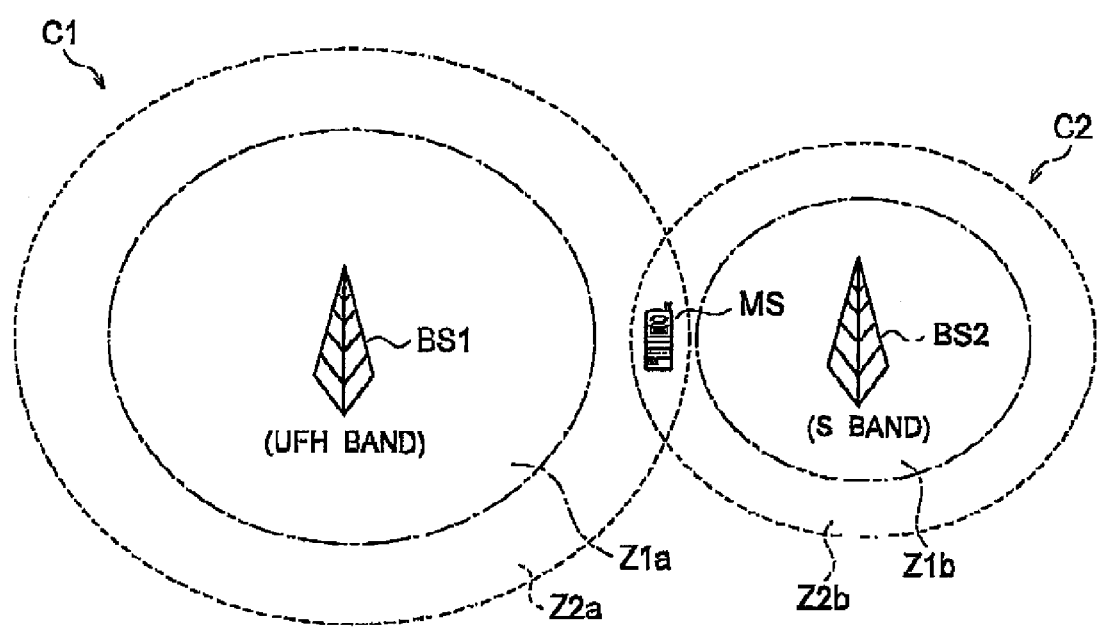
FIG. 8 is a schematic diagram showing a schematic configuration of a mobile communication system according to a first embodiment.

FIG. 8 is a schematic diagram showing an overall configuration example of a mobile communication system according to this embodiment.

The mobile communication system shown in FIG. 8 includes a radio communication terminal MS, a radio base station BS1 and a radio base station BS2. The radio base station BS1 forms a cell C1. The radio base station BS2 forms a cell C2. Note that the mobile communication system employs a multiband mobile communication system while conforming to IEEE802.15e (Mobile WiMAX (registered trademark)). The radio base stations BS1 and BS2 include multiple antenna elements.

As to a network configuration of the multiband mobile communication system, there are three cases: a case where the network includes only a dual band base station; a case where the network includes the dual band base station and a single band base station; and a case where the network includes only the single band base station. In this embodiment, for convenience of explanation, description will be given of the case where the multiband mobile communication system includes only the single band base station.

The radio base stations BS1 and BS2 use frequency bands different from each other. In this embodiment, the radio base station 2S1 uses a frequency band lower than that used by the radio base station BS2. As an example, the radio base station S1 uses a frequency band of about 800 MHz (hereinafter referred to as a "UHF band"). The radio base station BS2 uses a frequency band of about 2.5 GHz (hereinafter referred to as a "S band").

(Frame Configuration)

Figure 9:
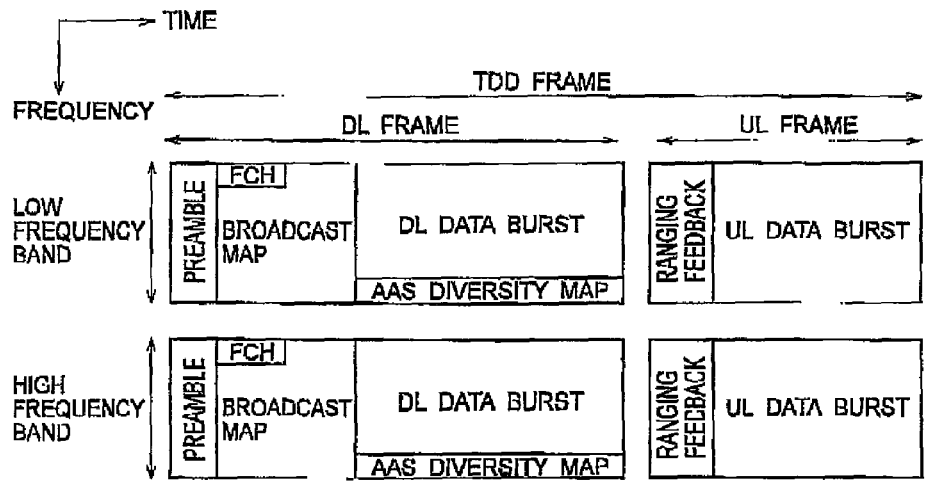
FIG. 9 is a schematic diagram showing a configuration example of a frame used in the mobile communication system according to the first embodiment.

FIG. 9 is a diagram showing a frame configuration of a TDD (Time Division Duplex) frame used in this mobile communication system.

In IEEE802.16e standard specification, an AAS (Adaptive Array antenna System) diversity map (AAS diversity MAP) is disposed as an option within a downlink (DL) frame. Moreover, a broadcast map (Broadcast MAP) is disposed within a frame header of the DL frame.

The broadcast map is control information to be notified to as multiple radio communication terminals MS located in zones Z1a and Z1b through a channel common to the multiple radio communication terminals MS, in other words, a broadcast channel. The broadcast map includes a DL map that is allocation information on DL data burst and a UL map that is allocation information on UL data burst.

On the other hand, the AAS diversity map is transmitted by a directional beam transmission (beamforming transmission or diversity-transmission) to certain radio communication terminals a MS located in zones Z2a and Z2b by AAS functions of the radio base stations BS1 and BS2.

Upon failure to acquire the broadcast map transmitted by the base station at cell edge, the radio communication terminal MS scans an AAS diversity map following the broadcast map within the same frame.

The AAS diversity map stores allocation information on a map (AAS beamformed broadcast MAP) transmitted with a directional is beam through another channel (hereinafter referred to as a "private map"). The radio communication terminal MS receives the private map based on the allocation information stored in the AAS diversity map.

As in the case of the broadcast map, the private map is information concerning allocation indicating channel allocation, a modulation class, an encoding method and the like. As in the case of the AAS diversity map, the private map is control information transmitted with a directional beam into zones of the same size as the zones Z2a and Z2b.

(Configuration Example of Radio Communication Terminal)

Figure 10:
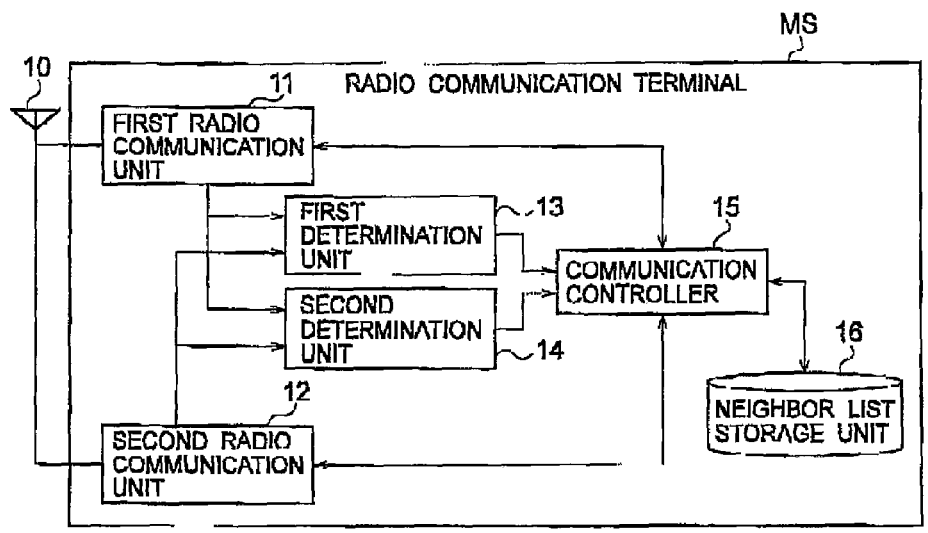
FIG. 10 is a functional block diagram showing a configuration example of a radio communication terminal according to the first embodiment.

FIG. 10 is a functional block diagram showing a configuration example of the radio communication terminal MS.

The radio communication terminal MS includes an antenna unit 10, a first radio communication unit 11, a second radio communication unit 12, a first determination unit 13, a second determination unit 14, a communication controller 15 and a a neighbor list storage unit 16.

The first radio communication unit 11 has a configuration corresponding to the UHF band and executes radio communication with the radio base station BS1 through the antenna unit 10. The second radio communication unit 12 has a configuration corresponding to the S band and executes radio communication with the radio base station BS2 through the antenna unit 10.

The neighbor list storage unit 16 stores a neighbor list that is a list of radio base stations located around the radio communication terminal Ms. Here, it is assumed that information about the radio base stations BS1 and BS2 (for example, base station IDs of the radio base stations BS1 and BS2) is stored in the neighbor list storage unit 16.

The first determination unit 13 determines whether or not the broadcast map is receivable from the radio base station BS1 or the radio base station BS2. Here, "receivable" means, for example, that the broadcast map is received with an accuracy that allows demodulation or decoding by the radio communication terminal MS.

When it is determined that the broadcast map can be, received from the radio base station BS1 or the radio base station BS2, the communication controller 15 uses channel allocation information and the like included in the broadcast map to establish a connection with the radio base station BS1 or the radio base station BS2.

When it is determined that the broadcast map cannot be received, the second determination unit 14 determines whether or not the AAS diversity map is receivable from the radio base station BS1 or the radio base station BS2, in ascending order of used frequency bands (i.e. the radio base station BS1 first, and then the radio base station BS2). When it is determined that the AAS diversity map can be received from the radio base station BS1 or the radio base station D82, the communication controller 15 uses channel allocation information and the like included in the private map indicated by the AAS diversity nap to establish a connection with the radio base station 351 or the radio base station BS2 and communicate therewith.

(Operations of Radio Communication Terminal)

Figure 11:
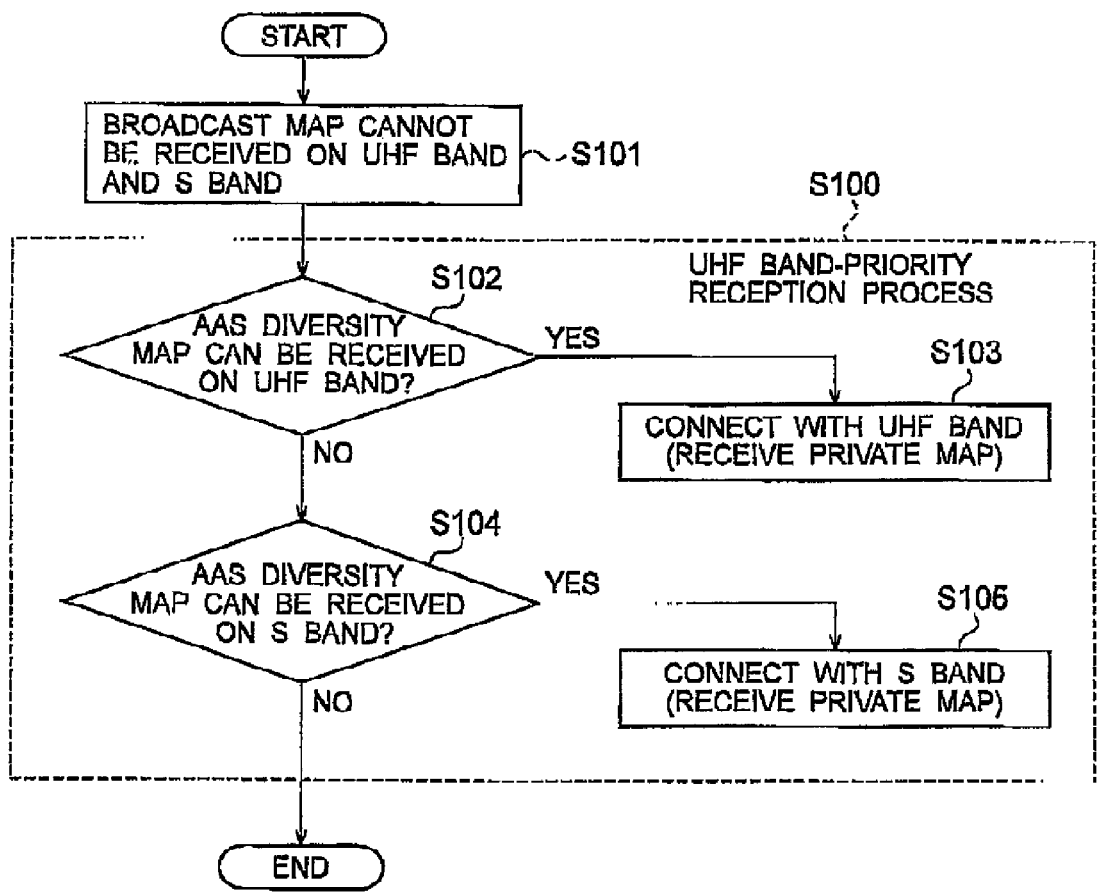
FIG. 11 is a flowchart showing operations of the mobile communication system according to the first embodiment.

FIG. 11 is a flowchart showing an operational flow of the radio communication terminal MS according to this embodiment. The operational flow shown in FIG. 11 is executed, for example, at the time of an initial network entry after turning on the power to the radio communication terminal MS, at the start of communication from an idle state, or the like.

In Step S101, the first determination unit 13 determines that no broadcast channels (frame headers) of the UHF band and the S band can be received.

In Step S102, the second determination unit 14 determines whether or not an AAS diversity map can be received from the radio base station using the UHF band, that is, the radio base station BS1. When it is determined that the AAS diversity map can be received from the radio base station BS1, the process moves to Step S103. On the other hand, when it is determined that the AAS diversity map cannot be received from the radio base station BS1, the process moves to Step S104.

In Step S103, the communication controller 15 selects the radio base station BS1 as a connection destination radio base station and communicates with the radio base station BS1. Specifically, the radio communication terminal MS receives a private map transmitted from the radio base station BS1 by using the AAS diversity map to establish a connection with the radio base station BS1.

In Step S104, the second determination unit 14 determines whether or not an AAS diversity map can be received from the radio base station using the S band, that is, the radio base station BS2. When it is determined that the AAS diversity map can be received from the radio base station BS2, the process moves to Step S105. On the other hand, when it is determined that the AAS diversity map cannot be received from the radio base station BS2, the radio communication terminal MS is subjected to the process under out-of-service conditions since there is no radio base station as the connection destination candidate.

In Step S105, the communication controller 15 selects the radio base station BS2 as the connection destination radio base station and communicates with the radio base station BS2. Specifically, the radio communication terminal MS receives a private map transmitted from the radio base station BS1 by using the AAS diversity map to establish a connection with the radio base station BS2.

ADVANTAGEOUS EFFECTS

As described in detail above, according to this embodiment, when the broadcast map cannot be received, the AAS diversity map can be stably received even at the cell edge by preferentially determining whether or not the AAS diversity map broadcasted by the radio base station using the lower frequency band (the radio base station BS1) can be received. In conclusion, the radio communication terminal MS can stably execute the cell search and communication after the cell search.

Second Embodiment

In this embodiment, description will be given of a configuration of selecting a connection destination radio base station by considering movement speed of a radio communication terminal MS. Note that, in the following second to fourth embodiments, differences from the first embodiment will be mainly described and repetitive description will be omitted.

(Configuration Example of Radio Communication Terminal)

Figure 12:
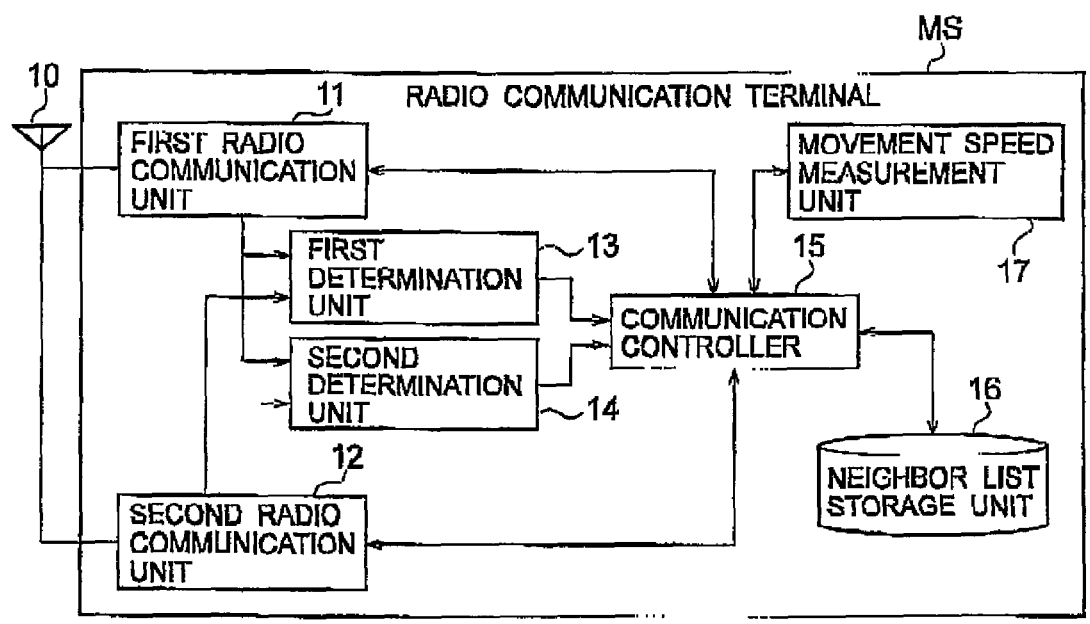
FIG. 12 is a functional block diagram showing a configuration example of a radio communication terminal according to a second embodiment.

FIG. 12 is a functional block diagram showing a configuration example of the radio communication terminal MS according to this embodiment.

The radio communication terminal MS is different from the radio communication terminal MS shown in FIG. 10 in including a movement speed measurement unit 17 configured to measure movement speed v of the radio communication terminal MS. The movement speed measurement unit 17 measures movement speed by using, for example, GPS (Global Positioning System), a gyro sensor or the like.

The movement speed v measured by the movement speed measurement unit 17 is notified to the communication controller 15. The communication controller 15 controls the first determination unit 13 and the second determination unit 14 based on the notified movement speed v.

(Operations of Radio Communication Terminal)

Figure 13:
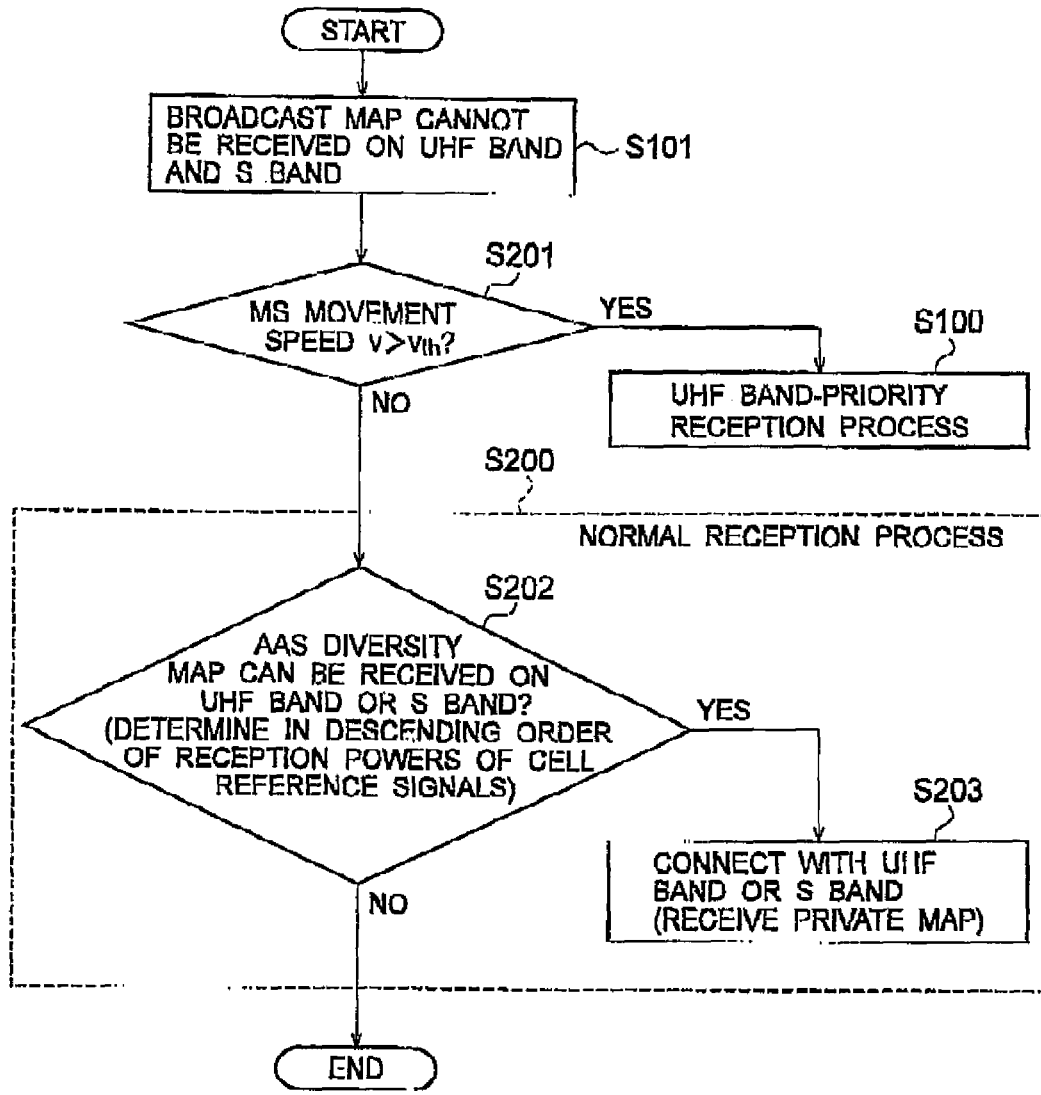
FIG. 13 is a flowchart showing operations of a mobile communication system according to the second embodiment.

FIG. 13 is a flowchart showing an operational flow of the radio communication terminal MS according to this embodiment.

In Step S101, the first determination unit 13 determines that broadcast maps broadcasted by radio base stations BS1 and BS2 cannot be received.

In Step S201, the communication controller 15 determines whether or not the movement speed of the radio communication terminal MS exceeds a preset threshold. When it is determined that the movement speed v of the radio communication terminal MS exceeds the preset threshold $v_{th}$, the process moves to step S100. In Step S100, an AAS diversity map reception operation giving priority to the UHF band shown in FIG. 11 is executed.

On the other hand, when it is determined that the movement speed v of the radio communication terminal MS is equal to or less than the preset threshold $v_{th}$, the process moves to Step S200. In Step S200, the communication controller 15 selects one of the radio base stations BS1 and BS2, from which the reception power of a cell reference signal is larger, and scans the AAS diversity map. When the AAS diversity map can be received, the process moves to Step S203 and the radio communication terminal MS is connected to the selected radio base station.

(Advantageous Effects)

According to this embodiment, when the movement speed v of the radio communication terminal MS is high, in other words, when instantaneous value variation of the reception power is likely to occur and a distance attenuation of the reception power is large, the radio communication terminal MS preferentially determines whether or not the AAS diversity map broadcasted by the radio base station using the lower frequency band (the radio base station BS1) can be received. Thus, the radio communication terminal MS can stably execute the cell search and easily establish a connection with the radio base station.

Moreover, according to this embodiment, when the movement speed v of the radio communication terminal MS is low, in other words, when the instantaneous value variation of the reception power is unlikely to occur and the distance attenuation of the reception power is small, the radio communication terminal MS selects the radio base station from which the reception power is larger. Accordingly, radio resources of the UHF band are relatively reserved compared with the determination method in the above case where the movement speed of the radio communication terminal MS is high.

Note that the present invention is not limited to the case where the radio communication terminal MS measures the movement speed. The radio base station may measure the movement speed of the radio communication terminal MS and notify the radio communication terminal MS of the measured movement speed.

Third Embodiment

In this embodiment, description will be given of a configuration in which a radio communication terminal MS select a connection destination radio base station by considering a reception power from each radio base station.

(Configuration Example of Radio Communication Terminal)

Figure 14:
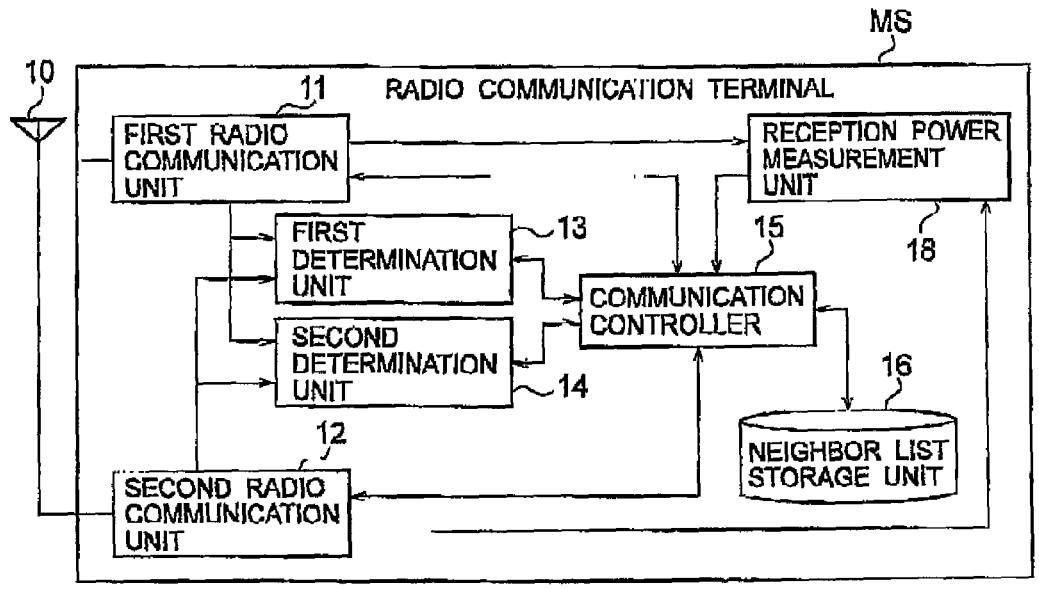
FIG. 14 is a functional block diagram showing a configuration example of a radio communication terminal according to a third embodiment.

FIG. 14 is a functional block diagram showing a configuration example of the radio communication terminal MS according to this embodiment.

The radio communication terminal MS is different from the radio communication terminal MS shown in FIG. 10 in including a reception power measurement unit 18 configured to measure reception powers from the radio base stations BS1 and B52.

The reception power measured by the reception power measurement unit 18 is notified to the communication controller 15. Based on the notified reception power, the communication controller 15 controls the first determination unit 13 and the second determination unit 14 and selects the connection destination radio base station.

Specifically, when the reception power front each radio base station is much larger than a preset required power, the communication controller 15 selects the radio base station from which the reception power is the largest as the connection destination regardless of the frequency band used by the radio base station.

Figure 15:
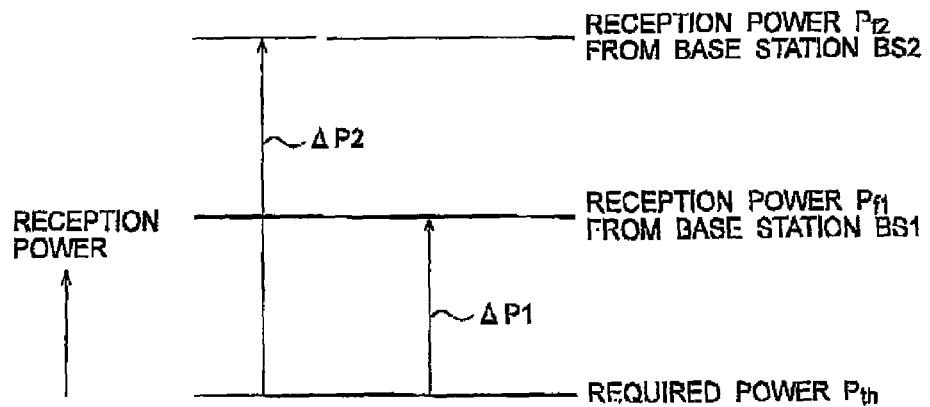
FIG. 15 is a diagram for explaining a communication method according to the third embodiment.

To be more precise, as shown in FIG. 15, the communication controller 15 compares a threshold D with a difference $\Delta P1$ between a required power P, and a reception power $P_{f1}$ from the radio base station BS1, and compares the threshold D with a difference $\Delta P2$ between the required power $P_{th}$ and a reception power $P_{f2}$ from the radio base station BS2. When both of the differences $\Delta P1$ and $\Delta P2$ exceed the threshold D, the communication controller 15 selects the radio base station having a larger reception power as the connection destination.

As described above, in this embodiment, when both of the differences $\Delta P1$ and $\Delta P2$ exceed the threshold D, this situation is regarded as one where stable access can also be executed to the radio base station BS2 using the S band, and the connection destination radio base station is selected regardless of the frequency band used by the radio base station.

(Operations of Radio Communication Terminal)

Figure 16:
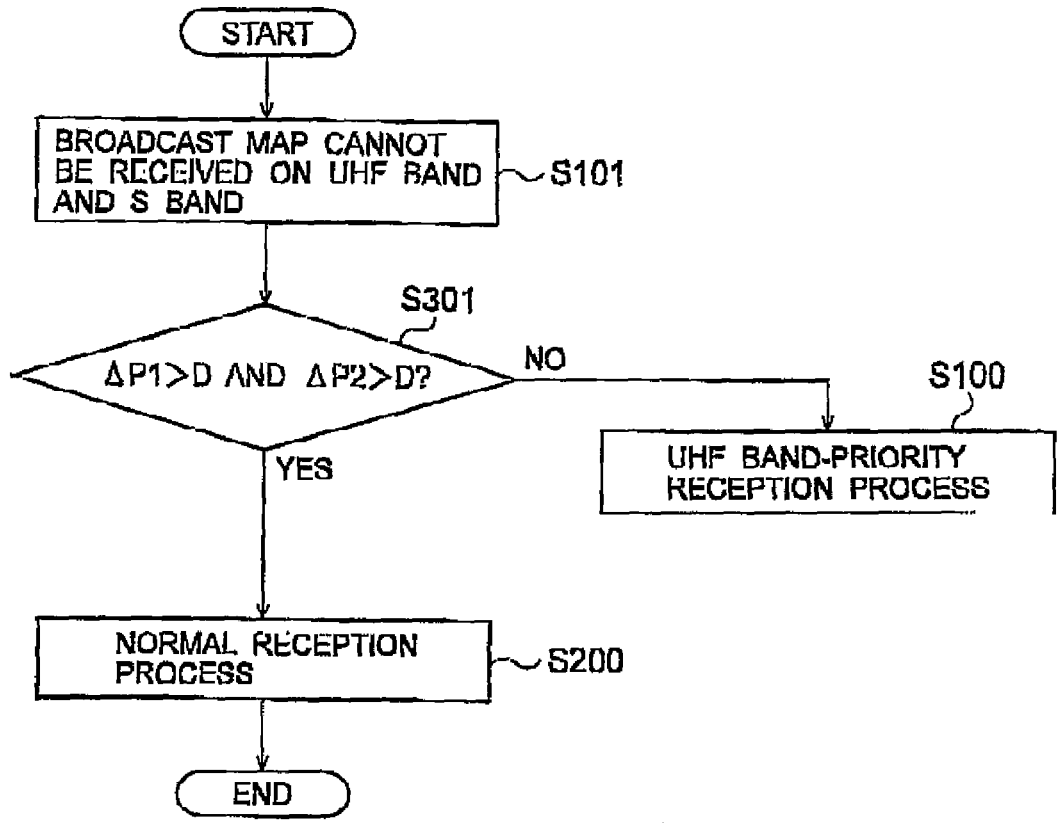
FIG. 16 is a flowchart showing operations of a mobile communication system according to the third embodiment.

FIG. 16 is a flowchart showing an operational flow of the radio communication terminal MS according to this embodiment.

In Step S101, the first determination unit 13 determines that broadcast maps broadcasted by the radio base stations BS1 and BS2 cannot be received.

In Step S301, the communication controller 15 determines whether or not the differences $\Delta P1$ and $\Delta P2$ between the reception powers from the radio base stations and the required reception power exceed the predetermined threshold D. When it is determined that the differences $\Delta P1$ and $\Delta P2$ exceed the predetermined threshold D, the process moves to Step S200. When it is determined that at least one of the differences $\Delta P1$ and $\Delta P2$ is not more than the predetermined threshold D, the process moves to Stop S100. In Step S100, as described above, the AAS diversity map reception operation giving priority to the UHF band is executed.

In Step S200, an AAS diversity map reception operation is giving priority to the radio base station from which the reception power of the cell reference signal is larger is executed as shown in FIG. 13.

(Advantageous Effects)

According to this embodiment, when the differences between the reception powers from the radio base stations and the required reception power are not more than the predetermined threshold, the radio communication terminal MS preferentially determines whether or not the AAS diversity map broadcasted by the radio base station using the lower frequency band (the radio base station BS1) can be received. Thus, the radio communication terminal MS can stably execute the cell search and easily establish a connection with the radio base station.

Moreover, according to this embodiment, by selecting the radio base station from which the reception power is larger when the reception powers from the radio base stations are much larger than the required power, radio resources of the UHF band are relatively reserved compared with the determination method based on the differences between the reception powers from the base stations and the required reception power.

Note that, in this embodiment, both of the difference $\Delta P1$ and the difference $\Delta P2$ are compared with the threshold D, the $\Delta P2$ in being the difference between the required power $P_{th}$ and the reception power $P_{f1}$ from the radio base station BS1 using the UHF band, the $\Delta P2$ being the difference between the required power $P_{th}$ and the reception power $P_{f2}$ from the radio base station BS2 using the S band. However, only the difference $\Delta P2$ may be compared with the threshold D. Specifically, when the difference $\Delta P2$ exceeds the threshold D, the radio base station from which the reception power is the largest is selected.

Thus, even when a high frequency band is selected as a result at the cell edge, the radio communication terminal MS can stably execute communication by acquiring a sufficient reception power. Alternatively, when the reception power $P_{f2}$ from the radio base station BS2 using the S band exceeds the predetermined threshold, the radio communication terminal MS may select the radio base station from which the reception power is the largest.

Fourth Embodiment

In this embodiment, as in the case of the third embodiment, description will be given of a configuration of selecting a connection destination radio base station by considering reception powers from radio base stations BS1 and BS2.

A radio communication terminal MS according to this embodiment is configured in the same manner as that of the third embodiment. However, the communication controller 15 is different from that of the third embodiment in selecting a radio base station having the largest reception power as a connection destination radio base station when a reception power from the radio base station using a higher frequency band (the radio base station BS2) is larger than a reception power from the radio base station using a lower frequency band (the radio base station BS1) by a predetermined value or more.

Figure 17:
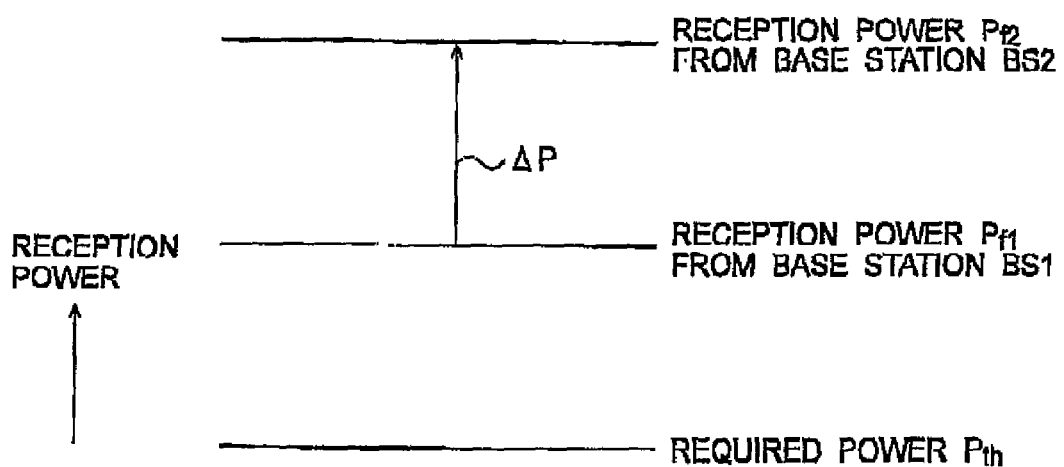
FIG. 17 is a diagram for explaining a communication method according to a modified example of the third embodiment.

To be more specific, as shown in FIG. 17, the communication controller 15 obtains a difference $\Delta P$ between a reception power $P_{f1}$ from the radio base station BS1 and a reception power $P_{f2}$ from the radio base station BS2 (i.e. $P_{f2}-P_{f1}$), by using the reception power $P_{f1}$ from the radio base station BS1 as a reference point. When the difference $\Delta P$ exceeds a threshold G, the communication controller 15 selects the radio base station having the largest reception power as the connection destination regardless of the frequency band used by the radio base station.

As described above, in this embodiment, when the difference $\Delta P$ exceeds the threshold D, this situation is regarded as one where stable access can also be executed to the radio base station BS2 using the S band, and the connection destination radio base station is selected regardless of the frequency band used by the radio base station.

(Operations of Radio Communication Terminal)

Figure 18:
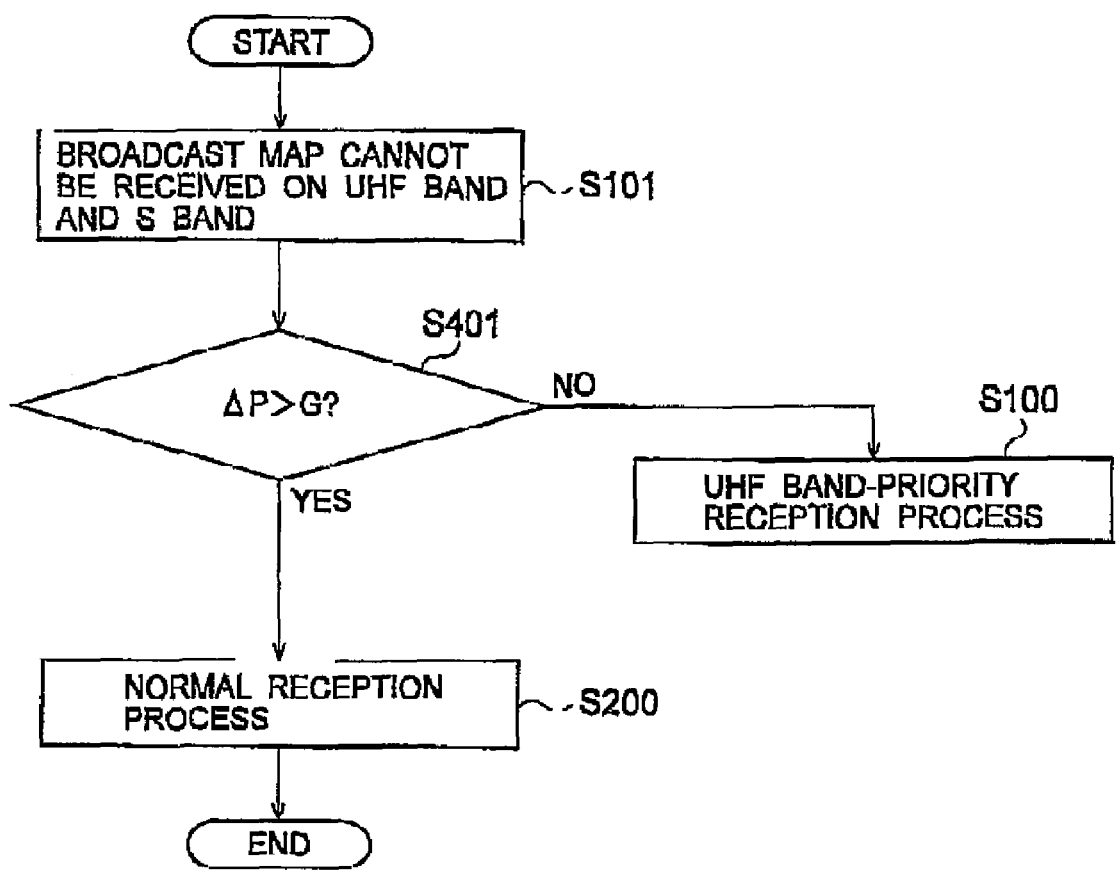
FIG. 18 is a flowchart showing operations of a mobile communication system according to the modified example of the so third embodiment.

FIG. 18 is a flowchart showing an operational flow of the radio communication terminal MS according to this embodiment.

In Step S101, the first determination unit 13 determines that broadcast maps broadcasted by the radio base stations BS1 and BS2 cannot be received.

In Step S401, the communication controller 15 determines whether or not the difference $\Delta P$ between the reception power $P_{f1}$ from the radio base station BS1 and the reception power $P_{f2}$ from the radio base station BS2 (i.e. $P_{f2}-P_{f1}$) exceeds a predetermined threshold G. When it is determined that the difference $\Delta P$ exceeds the predetermined threshold G, the process moves to Step S200. When it is determined that the difference $\Delta P$ is not more than the is predetermined threshold G, the process moves to Step S100.

In Step S100, as described above, the AAS diversity map reception operation giving priority to the UHF band is executed.

In Step S200, an AAS diversity map reception operation giving priority to the radio base station from which the reception power of the cell reference signal is larger is executed as shown in FIG. 13.

(Advantageous Effects)

According to this embodiment, when the difference between the reception power from the radio base station using the higher frequency band (the radio base station BS2) and the reception power from the radio base station using the lower frequency band (the so radio base station BS1) in less than the predetermined value, the radio communication terminal MS preferentially determines whether or not the AAS diversity map broadcasted by the radio base station using the lower frequency band (the radio base station BS1) can be received. Thus, the radio communication terminal MS can stably execute the cell search and easily establish a connection with the radio base station.

Moreover, according to this embodiment, when the reception power from the radio base station using the higher frequency band (the radio base station BS2) is larger than the reception power from the radio base station using the lower frequency band (the radio base station BS1) by the predetermined value or more, the radio communication terminal MS selects the radio base station from which the reception power is the largest regardless of the frequency band used by the radio base station. Thus, radio resources of the UHF band are relatively reserved compared with the determination method in the above case where the difference between the reception power from the radio base station using the higher frequency band (the radio base station BS2) and the reception power from the radio base station using the lower frequency band (the radio base station BS1) is less than the predetermined value.

Other Embodiments

As described above, the present invention has been described through the first to fourth embodiments. However, it should be understood that the present invention is not limited to the description and drawings which constitute a part of this disclosure. From this disclosure, various alternative embodiments, examples and operational technologies will become apparent to those skilled in the art.

For example, as to measurement of the reception power level of the AAS diversity map and the private map, it is required to use a stable level by obtaining a moving average as in the case of the conventional cell search. However, since the AAS diversity map and the private map cannot be received over all bursts or frames, it is preferable that the moving average is obtained over specific bursts or frames.

In the above first to fourth embodiments, the description was given by taking, as an example, the multiband mobile communication system using the two frequency bands, the UHF band and the S band. However, the communication method according to the first to fourth embodiments can also be implemented to a multiband mobile communication system using three or more frequency bands.

In the above first to fourth embodiments, the description was given of the case where the AAS diversity map is information indicating the private map, to be more specific, a private map region in the DL data burst. However, the present invention is not limited thereto but the AAS diversity map may be set as information having the same contents as the broadcast map.

Moreover, in the above first to fourth embodiments, the description was given of the mobile communication system employing the multiband mobile communication system while conforming to the WiMAX standard. However, the present invention is not limited to the WiMAX standard but can also be implemented to a mobile communication system employing the multiband mobile communication system while conforming to, for example, the next-generation iBurst (registered trademark) standard, the next-generation PHS standard or the like.

As described above, it should be understood that the present invention includes various embodiments and the like which are not described herein. Therefore, the present invention is defined only by items specific to the invention according to claims pertinent based on the foregoing description.

Note that the entire contents of Japanese Patent Application No. 2006-322GG1 (filed on Nov. 29, 2006) are incorporated herein by reference.

INDUSTRIAL APPLICABILITY

The present invention is useful in wireless communication such as mobile communication since a connection with the radio base station can be easily established by allowing the cell search to be stably executed even when the radio communication terminal is located at the cell edge in a multiband mobile communication system.

The invention claimed is:
1. A communication method in a multiband mobile communication system having a radio communication terminal and a plurality of radio base stations capable of using a plurality of frequency bands, comprising the stops of:
  transmitting, at the radio base station, first broadcast control information through a broadcast channel common to a plurality of radio communication terminals, the first broadcast control information being used for communication control;
  transmitting, at the radio base station, dedicated control information to a specific radio communication terminal with use of a directional beam, the dedicated control information being used for communication control;
  transmitting, at the radio base station, second broadcast control information to a certain radio communication terminal with use of a directional beam, the second broadcast control information indicating allocation of the dedicated control information;
  determining, at the radio communication terminal, whether or not the first broadcast control information can be received from the radio base stations;
  determining, at the radio communication terminal, whether or not the second broadcast control information can be received from the radio base stations in ascending order of used frequency bands, when it is determined that the first broadcast control information cannot be received; and
  selecting, at the radio communication terminal, a radio base station, which is determined to be a radio base station from so which the second broadcast control information ran be received, as a connection destination radio base station, and communicating, at the radio communication terminal, with the selected radio base station.

2. The communication method according to claim 1, further comprising the step of measuring movement speed of the radio communication terminal,
  wherein, in the step of determining whether or not the second broadcast control information can be received, whether or not the second broadcast control information can be receive is determined for the radio base stations in ascending order of used frequency bands when it is determined, that the first broadcast control information cannot be received and when the movement speed exceeds a predetermined threshold.

3. The communication method according to claim 2, further comprising the steps of:
  measuring reception power from the radio base stations; and
  selecting a radio base station from which reception power is the largest as the connection destination radio base station, when it is determined that the first broadcast control information cannot be received and when the movement speed is equal to or less than the predetermined threshold.

4. The communication method according to claim 1, further comprising the step of measuring reception power from the radio base stations,
  wherein, in the step of determining whether or not the second broadcast control information can be received, whether or not the second broadcast control information can be received is determined for the radio base stations in ascending order of used frequency bands, when it is determined that the first broadcast control information cannot be received and when at least a difference between a required reception power and a reception power from the radio base station using the higher frequency band is equal to or less than a predetermined threshold.

5. The communication method according to claim 4, further comprising the step of selecting a radio base station from which reception power is the largest as the connection destination radio base station, when it is determination that the first broadcast control information cannot be received and when at least the difference exceeds the predetermined threshold.

6. The communication method according to claim 1, further comprising the step of measuring a reception power from the radio base station,
  wherein, in the stop of determining whether or not the second broadcast control information can be received, whether or not the second broadcast control information can be received is determined for the radio base stations in ascending order of used frequency bands, when it is determined that the first broadcast control information cannot be received and when a difference between a reception power from the radio base station using the higher frequency band and a reception power from the radio base station using the lower frequency hand is less than a predetermined value.

7. The communication method according to claim 6, further comprising the step of selecting a radio base station from which reception power is the largest as the connection destination radio base station, when it is determined that the first broadcast control information cannot be received and when the reception power from the radio base station using the higher frequency band is larger than the reception power from the radio base station using the lower frequency band by a predetermined value or more.

8. A radio communication terminal used in a multiband mobile communication system having a plurality of radio base stations capable of using a plurality of frequency bands, comprising;

a first determination unit configured to determine whether or not first broadcast control information can be received from the radio base stations, the first broadcast control information being used for communication control;

a second determination unit configured to determine whether or not second broadcast control information can be received from the radio base stations in ascending order of used frequency bands, when it is determined that the first broadcast control information cannot be received, the second broadcast control information indicating allocation of dedicated control information used for communication control; and a communication controller configured to select a radio base station, which is determined to be a radio base station from which the second broadcast control information can be received, as a connection destination radio base station, and to communicate with the selected radio base station, wherein the first broadcast control information in transmitted to a plurality of radio communication terminals through a broadcast channel common to a plurality of radio communication terminals, the dedicated control information is transmitted to a specific radio communication terminal with use of a directional beam, and the second broadcast control information is transmitted to a certain radio communication terminal with use of a directional beam.

* * * * *